United States Patent
Ashina et al.

[11] 3,918,917
[45] Nov. 11, 1975

[54] APPARATUS FOR REACTING ORGANIC COMPOUNDS AND SULFUR TRIOXIDE

[75] Inventors: Yoshiro Ashina; Yasumasa Yamaguchi; Atushi Fujiwara, all of Yokohama, Japan

[73] Assignees: Nitto Chemical Industry Co., Ltd.; Nippon Unitol Co., Ltd., both of Tokyo, Japan

[22] Filed: Apr. 16, 1973

[21] Appl. No.: 351,387

[30] Foreign Application Priority Data
Apr. 15, 1972  Japan .................................. 47-37374

[52] U.S. Cl. .............. 23/283; 260/458; 260/513 R; 261/112
[51] Int. Cl.[2] .................... B01J 10/00; C07C 141/02; C07C 141/10; C07C 143/02
[58] Field of Search ...... 23/284, 285, 283; 261/112; 260/686, 504 R

[56] References Cited
UNITED STATES PATENTS

| | | | |
|---|---|---|---|
| 3,138,647 | 6/1964 | Krantz | 261/112 |
| 3,169,142 | 2/1965 | Knaggs et al. | 260/686 X |
| 3,170,007 | 2/1965 | Krantz | 261/112 X |
| 3,427,342 | 2/1969 | Brooks et al. | 23/284 X |
| 3,482,947 | 12/1969 | Jacobsen et al. | 23/285 |
| 3,501,276 | 3/1970 | Vander Mey | 23/284 |

*Primary Examiner*—Wolk Morris O.
*Assistant Examiner*—Arnold Turk
*Attorney, Agent, or Firm*—Sughrue, Rothwell, Mion, Zinn & Macpeak

[57] ABSTRACT

A multi-tube thin-film type reaction apparatus for the reaction of an organic compound and gaseous sulfur trioxide, said apparatus comprising a plurality of tube assemblies comprising a reaction tube provided with a gas- and liquid-feeding structure at the upper portion of the reaction tube, characterized in that: the reaction tubes have an inner diameter of 16 - 90 mm, an inner tube having liquid-distributing holes of 1 - 3 mm in diameter is provided at the top end of each reaction tube, said inner tube being surrounded by an outer tube to form a liquid receiver between both tubes, a reaction gas nozzle is inserted in the interior of said inner tube and communicates with said reaction tube to permit the substantially uninterrupted flow of reaction gas from the reaction gas nozzle to said reaction tube, the lateral clearance between said reaction tube and said reaction gas nozzle being greater than 2 mm and the end of said reaction gas nozzle being 5 - 300 mm below said liquid-distributing holes, a pressure-leveling opening is provided between the upper portion of said liquid receiver and said reaction tube, and liquid organic compound feed means is provided where at least a portion of each liquid organic compound feed means has an inner diameter of 0.5 - 5 mm and a length/inner diameter ratio of 10 - 1,000 to render the flow resistance from the source of liquid organic compound to a liquid receiver within the range 0.1 - 0.8 Kg/cm$^2$.

8 Claims, 2 Drawing Figures

U.S. Patent  Nov. 11, 1975  3,918,917
FIG. 1
FIG. 2
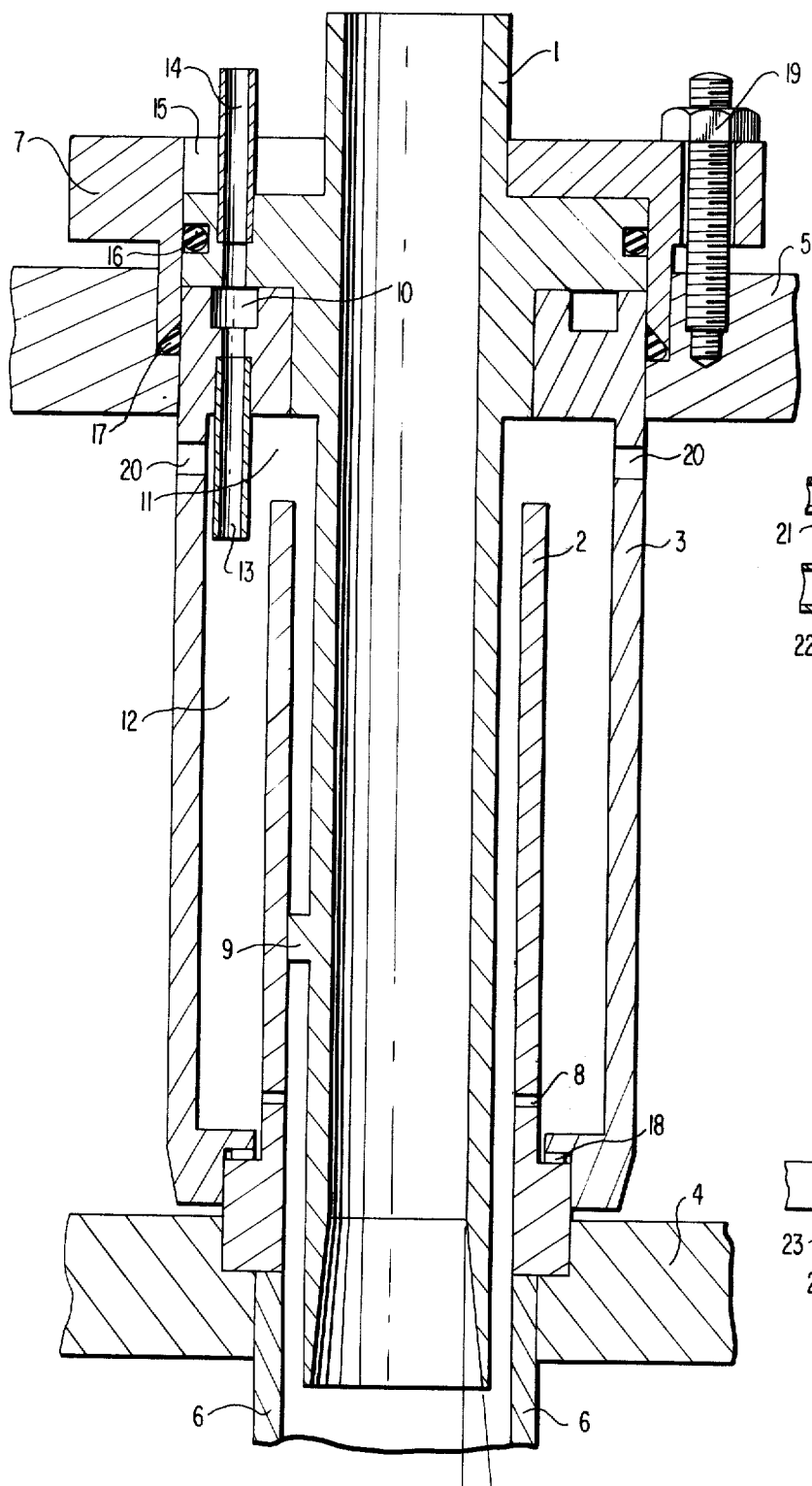
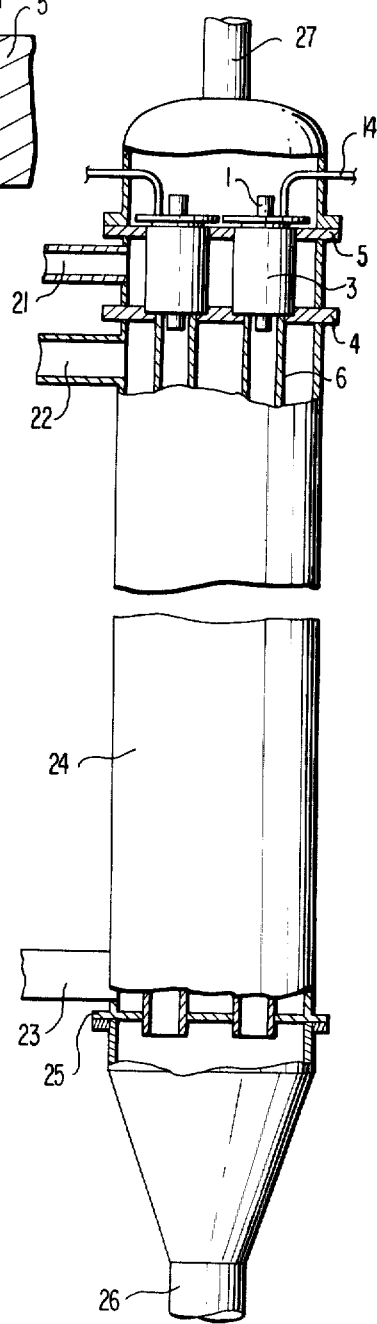

APPARATUS FOR REACTING ORGANIC COMPOUNDS AND SULFUR TRIOXIDE

BACKGROUND OF THE INVENTION

1. Field of the Invention

This invention relates to an apparatus for reacting organic compounds with gaseous sulfur trioxide which is diluted with an inert gas.

2. Description of the Prior Art

Since the reaction rate of organic compounds and sulfur trioxide is very high, gaseous sulfur trioxide diluted with an inert gas (hereinafter called a "reaction gas") is used in the reaction. Such reactions have hitherto been carried out by means of a parallel-flow thin-film type reaction apparatus in which an organic compound flows down in the form of thin film on a solid wall surface while the reaction gas is run in the same direction.

However, in the manufacture of surface active agents, which show a high bio-decomposability and have a large commercial demand, such as, for example, primary higher alcohol sulfates and ethoxysulfates and secondary higher alcohol ethoxysulfates, side reactions are apt to take place during the reaction of the starting organic compound and sulfur trioxide, and there has not yet been any parallel-flow thin-film type reaction apparatus in which organic compounds which are apt to undergo side reactions can be sulfated or sulfonated continuously on a large scale to provide a less colored product in a high yield.

As a result of studying a wide range of parallel-flow thin-film type reactions of organic compounds particularly apt to undergo side reactions with sulfur trioxide, we, the inventors, realized that the gas-liquid structure at the beginning of gas-liquid contact and the gas-liquid flow condition and the mol ratio of sulfur trioxide to organic compound in a plurality of reaction tubes necessary for high production rates should be improved.

Regarding the gas-liquid structure and the flow condition at the beginning of gas-liquid contact, previous patents, for example, U.S. Pat. Nos. 3,328,460 and 3,482,947, have described the method in which an organic compound is fed from the clearance between the wall of reaction tube, on which the thin film of organic compound is formed, and the nozzle for introducing the reaction gas. In this method, however, areas wetted and unwetted with the organic compound are formed on the solid surface of the contact-starting section and the organic compound turns black on the boundary line of both areas, resulting in the coloring of the reaction product. Further, solid matter deposits in the clearance during long term operation, resulting in the heterogeneous flow of liquid film.

U.S. Pat. No. 3,169,142 has described the method in which the reaction gas is jetted at high speed from a fine nozzle to contact the liquid film, whereby the jet flow of reaction gas gradually spreads after leaving the nozzle and diffuses over in the reaction tube after running a certain distance. In this case, however, a secondary rising flow of the reaction gas forms around the jet flow and the organic compound may stagnate, whereby the liquid film becomes thicker and side reactions of the organic compound increase. If too fine of a nozzle is used, the liquid film mists and side reactions and coloring take place in the mist.

Regarding the mol ratio of sulfur trioxide to the organic compound, this is important with organic compounds that react only with difficultly and which are apt to undergo side reactions. These organic compounds either result in an increased amount of unreacted material with a small amount of sulfur trioxide or show increased side reactions for a large amount of sulfur trioxide, resulting in lowering the yield of end sulfation product. Generally speaking, it is necessary that the error of mol ratio control be less than ± 10 percent for the reaction of primary higher alcohol ethoxylates with sulfur trioxide and less that ± 5 percent for the reaction of primary higher alcohols and secondary higher alcohol ethoxylates with sulfur trioxide.

In general, the residence time of an organic compound on the inner wall of parallel-flow thin-film type reaction apparatus is about 20 sec., and in the reaction apparatus described in U.S. Pat. Nos. 3,328,460 and 3,482,947 the amount of organic compound flowing in the system is pulsated by pressure variations of the reaction gas so that the mol ratio changes with the lapse of time to give lowered yield.

It is also very difficult in a multi-tube reaction vessel, which is suitable for the high volume productions, to control the mol ratio in each tube in a constant manner. In the method for separating organic compounds by means of an orifice described in U.S. Pat. No. 3,482,947, the lower limit of error in the orifice having an inner diameter of 1 mm is ± 0.03 mm due to limitations in the manufacturing accuracy of the orifice, and the error in the flow of organic compound flowing in the system is ± 6 percent, so that it is impossible to control the mol ratio to within ± 5 percent.

Strictly speaking, the inner diameter of each reaction tube differs, so that the amount of reaction gas flowing differs in each reaction tube, resulting in differences in the mol ratio and in a lowering of reaction yield.

The reaction apparatus according to this invention is free from the disadvantages mentioned above and is suitable for processing on a large scale.

SUMMARY OF THE INVENTION

This invention relates to a multi-tube thin-film type reaction apparatus for the reaction of organic compounds and sulfur trioxide wherein reaction tubes having an inner diameter of 16 – 90 mm are provided in a shell - tube arrangement substantially vertically to a pipe plate. The top end of the reaction tube is provided with an inner tube/inter tube assembly, the inner tube having liquid-distribution holes and being surrounded by an outer tube whereby both of said tubes form a liquid receiver, a reaction gas nozzle having a guide is inserted in the inner tube and joins the upper end of the reaction tube, a pressure-equalizing opening is provided between the upper portion of the liquid receiver and the interior of the reaction tube, and the dimensions of these members are limited to within a specified range described hereinafter to provide superior gas-liquid contact. A passage to the liquid receiver for the introduction of liquid is provided with a fine tube having an inner diameter of 0.5 – 5 mm and a length/inner diameter ratio of 10 – 1,000 to provide a flow resistance in the fine tube 0.1 – 0.8 Kg/cm$^2$.

The object of this invention is to provide a reaction apparatus in which the sulfation or sulfonation of organic compounds with sulfur trioxide is carried out continuously on a large scale.

Another object of this invention is to provide a reaction apparatus in which, in the reactions as mentioned above, above all in such reactions where side reactions are apt to occur, a less colored product is obtained in a high yield.

BRIEF DESCRIPTION OF THE DRAWINGS

The apparatus according to this invention will now be illustrated with reference to the drawings.

FIG. 1 shows a cross section of a preferred example of the upper structure of the reaction apparatus according to this invention.

FIG. 2 shows a partially cut away front view of a shell and tube assembly wherein the upper structure of the reaction apparatus of the present invention is used.

DETAILED DESCRIPTION OF THE INVENTION

The reaction apparatus according to this invention is a multi-tube, parallel-flow thin-film reaction vessel, which is especially useful for large scale productions. A plurality of reaction tubes 6 of same size and structure are arranged in parallel. The upper structure of the apparatus, as shown in the drawing, is the main feature of this invention. A flow resistance portion which functions to keep the mol ratio of sulfur trioxide to organic compound fed to each reaction tube 6 constant is also provided.

The portion for introducing the liquid and gas as shown in FIG. 1 comprises a reaction gas nozzle 1, and inner tube 2, and outer tube 3, a flange 7, a tube 13, a tube 14, an opening 15 in the flange 7 in which the tube 14 is piped, O-rings 16 and 17, and a packing 18, and is fixed to pipe plates 4 and 5 to which the reaction tube 6 is fitted by means of nuts and bolts 19. Also shown in FIG. 1 is an optional port 20 for the introduction of secondary gas, as explained in greater detail at a later point.

In general, the inner tube having a substantially same inner diameter as the inner diameter of the reaction pipe as well as a tapered inner tube may be used. The inner diameter of the reaction tube and inner tube should be same at the connecting portions.

The reaction gas is introduced into the reaction gas nozzle 1. The reaction gas nozzle 1 is placed on the outer tube 3 and fixed to the pipe plate 5 by means of the flange 7.

Eccentricity of the reaction gas nozzle 1 from the center of the reaction pipe 6 will cause the collision of reaction gas onto one side of the reaction pipe 6 to lower the yield of desired product. The reaction gas nozzle 1 is provided with a guide 9 in contact to the inner tube 2, so that the error of eccentricity is less than 0.5 mm, preferably less than 0.2 mm. Phrased somewhat differently, the center line of the reaction gas nozzle 1 and the center line of the reaction pipe are most desirably along the same line, but in the case construction error exists, the center lines should be less than 0.5 mm out of alignment.

Since the wetting of the outer surface of the reaction gas nozzle 1 with the liquid running down from the liquid receiver brings about the undesirable result that liquid drops which have been deteriorated by decomposition and turned black are formed from the top of the nozzle, the clearance between the reaction gas nozzle 1 and the reaction tube 6 is necessarily more than 2 mm, preferably 3 mm or more.

However, too small a reaction gas nozzle unnecessarily disturbs the liquid film when the gas is jetted from the nozzle and coloring, which is probably caused by the formation of a mist of organic compound, may take place, so that the clearance is preferably 3 – 5 mm.

The length of the reaction gas nozzle depends on the position of the bottom of the reaction gas nozzle, this position being determined in such a manner that the contact with $SO_3$ - gas begins after the formation of a sufficiently uniform liquid film, the depth of liquid in the liquid receiver desired and the gas flow resistance, so as to give a uniform distribution of gas to each reaction pipe, and the length is usually more than 150 mm, and preferably more than 250 mm, e.g., 500 mm or greater. On an industrial scale, usually the reaction gas nozzle is about 2.2 m or less, though maximum length is not as important as minimum length.

A liquid organic compound passes through the tube 14 to be fed through the ring-like passage 10 formed by the reaction gas nozzle 1 and the outer tube 3 from the tube 13 to the liquid receiver 12 formed by the inner tube 2 and the outer tube 3, and runs down from the liquid-distributing holes 8 formed at the lower portion of inner tube 2 along the inner wall of the inner tube 2 with the formation of an uniform liquid film.

The liquid distributing holes 8 are very important for the formation of a stable, thin film. In general, an orifice having an inner diameter of less than 0.2 mm is apt to be closed during the flow of liquid. In the apparatus according to this invention, the organic compound reacts with an excess of sulfur trioxide to yield a black mass so that the inner diameter of a nozzle is necessarily more than 1 mm, and since the organic compound is apt to adhere to a reaction gas nozzle 1 having an inner diameter of more than 3 mm, the inner diameter of the liquid distributing holes 8 is 1 – 3 mm, preferably 1 – 2 mm, in order to form a stable thin film over long periods of time.

The number of the liquid distributing holes 8 is determined in such a manner that the pressure loss can be 2 – 2,000 mmH$_2$O, more preferably 5 – 100 mmH$_2$O, when a given amount of organic compound flows therethrough. Preferably, the maximum flow amount for one liquid distributing hole is less than half of the minimum flow amount at which the liquid is jetted from the liquid distributing hole in the form of column away from the wall of the inner tube 2.

The liquid flows in the form of a uniform, thin film along the inner surface of the reaction tube 6 by means of the liquid distributing holes 8 and, quite different from the use of a weir, the liquid distribution is little affected in an adverse manner by an inclination of the reaction tube from the vertical direction. As is generally the case with gas-liquid contact apparatus, however, the reaction tubes are generally oriented vertically, or as close thereto as is possible, since as the reaction tubes vary more and more from the upright, generally the reaction process becomes more and more difficult to run in a uniform manner due to increasing non-vertical liquid flow. This trend will be apparent to one skilled in the art, and suffice it to say the tubes are maintained substantially vertical.

A pressure equalizing opening 11 is provided at the upper portion of the inner tube 2. This opening serves to equalize the pressure between the liquid in the liquid receiver 12 and the gas between the reaction gas nozzle 1 and the inner wall 2 or the reaction tube 6 to prevent pulsing of the flow of the organic compound from the liquid distributing holes 8 due to pressure changes in the reaction gas. Without the pressure-leveling opening 11, the amount of liquid in the liquid receiver 12 could vary to a large extent by a slight pressure change in the reaction gas because the pressure difference over the liquid-distributing holes 8 is very small (as described above), and since the residence time of the liquid present in the form of a thin film on the inner wall of the reaction tube 6 is about 20 sec., therefore changes in the mol ratio of sulfur trioxide to organic compound results in the lowering of yield in a matter of seconds.

The liquid distributing holes 8 are provided 5 - 300 mm above, more preferably 20 - 100 mm above, the bottom of the reaction gas nozzle (for convenience, measurement is usually made to the center of the holes). So long as this parameter is met, the exact amount the reaction gas nozzle 1 protrudes into the reaction tube 6 is not overly important, though practically speaking the reaction gas nozzle 1 will always enter into the area defined by the reaction tube 6. While theoretically the reaction would not be adversely affected if the reaction gas nozzle were to terminate a slight bit before the beginning of the reaction tube 6, in practice nothing is to be gained by such a construction.

If the liquid distributing holes 8 are too close to the bottom of the reaction gas nozzle 1, the liquid is blown off by the high speed jet of the reaction gas so close to the holes 8 before the liquid film is sufficiently accelerated by gravity, converted to a mist and undergoes coloring and decomposition, and at the same time sulfur trioxide diffuses at the boundary between are as wetted and not wetted with organic compound above and below the liquid distributing holes 8, resulting in coloring and blocking. When the distance is larger, it is difficult to manufacture the reaction gas nozzle 1.

It is not always necessary that all liquid distributing holes be provided at the same height. When the height differs, measurement is from the hole(s) closest to the bottom of the reaction gas nozzle, considering the 5 - 300 mm range heretofore set, and the fast that the lowermost limit is an operational one, and the uppermost limit is set by manufacturing difficulty. For practical purposes, all holes will be within the 5 - 300 mm range, even if spaced. So as to permit a safety factor to avoid blowing liquid off of the wall, the average velocity of the reaction gas is usually 15 m/sec - 90 m/sec in the reaction tube, preferably 20 m/sec - 70 m/sec. If the gas velocity is too low, the thin film of liquid is only weakly agitated by the gas flow. This results in lowering of reaction yield and coloring of product. If the gas velocity is higher than 90 m/sec., pressure drop often becomes too large and the quantity of liquid mist often increases. The length of the reaction tubes is in accordance with the prior art. On an industrial scale, this will generally be about 150 to about 800 mm. Generally speaking, the clearance between outer wall of inner tube 2 and inner wall of outer tube 3 is not important, and for most commercial units will be from about 2 to about 20 mm. The same can generally be said for the height of the liquid in liquid receiver, which can be established by the formula:

$$\text{height} = \frac{\text{The pressure loss of the liquid distributing holes}}{\text{density of liquid.}}$$

Again, for most commercial operation this will be from about commonly 5 to 100 mm. Care should be taken, of course, that during a process run the liquid organic compound does not overflow the top of the inner tube 2. The density of most organic liquids commonly reacted with sulfur trioxide on an industrial scale is nearly 1 g/cm$^3$.

As mentioned above, according to this invention, the object of this invention of contacting a liquid and a gas in a stable manner for a long period of time with a uniform flow rate distribution can be accomplished by a relatively simple structure, in which all members can be assembled in then given position with good accuracy. This is advantageous in multiple tube assemblies required for reaction vessels of an industrial scale.

The following description emphasizes another important feature of this invention.

As described hereinbefore, the mol ratio of $SO_3$/organic compound introduced into the reaction vessel or in the reaction product is an important factor which influences reaction results in the sulfonation or sulfation of an organic compound with sulfur trioxide, and the importance of this factor is increased when the organic compound is essentially unstable and apt to form by-products.

According to our experiments with parallel-flow, thin-film reaction vessels, a change in the mol ratio often effects the reaction results more greatly than changes in other operational factors such as, for example, the gas flow rate, liquid flow rate and temperature in the reaction pipe, and an absolutly equal distribution of liquid and gas to each tube is not necessarily required in multi-tube reaction vessels of an industrial scale but a substantially constant gas/liquid ratio in each tube is required.

In order to distribute a liquid and gas in a strictly equal amount to each reaction tube, it is known to insert a flow resistance by means of an orifice or slit in each of a plurality of flow lines which originate from a common feed line. Disadvantageously, in such method, the obtaining of uniformity of flow causes an excessive pressure loss, requires high manufacturing accuracy and a complicated structure, presents a risk of clogging in an orifice or slit having too small a cross-section of passage as is necessary for obtaining an excessively high pressure drop, as such blocking can not be discovered before the fact. With such devices, variations in the flow amount cannot actually be eliminated in the distribution of gas as such requires an excessive pressure loss or an adjustment so that the total pressure loss of the reaction gas nozzle and the reaction tube are equal in each assembly, which are impractical on an industrial scale.

As a result of fluid dynamics analysis aiming at obtaining an injection effect when the reaction gas is spouted at high speed from the reaction gas nozzle 1 into the reaction pipe 6, it has been found that the gas/liquid mol ratio is kept constant in a self-controlling manner even if the distribution of the reaction gas to each reaction tube is not uniform when the flow resistance by means of a fine nozzle is provided in the liquid flow passage branched towards each reaction pipe and the resistance flow value is a value which is determined mainly as a function of the mean spouting or exit velocity from the reaction gas nozzle.

To obtain this self-controlling effect, it is necessary to strictly machine the inner diameters of all reaction gas nozzles so that they are equal, so that any change in the flow amount of gas to each reaction pipe appears directly as a change in the spouting velocity from the reaction gas nozzle. Since the inner diameter tolerance of commercial stainless steel pipe does not satisfy the accuracy needed, it is necessary to finish the inner surface by means of, for example, lathing in the manufacture of the reaction gas nozzle. The acceptable tolerance of the inner diameter of the reaction gas nozzle is about ± 0.3 mm, most advisably, of course, less than 0.3 mm. Thus, in the reaction tube in which greater (or lesser) amount of gas than the standard occurs, due to the various reasons mentioned above, the gas is spouted at a higher (or lower) flow rate from the nozzle. From the apparatus shown in FIG. 1, a larger (or smaller) injection effect increases (or decreases) the static pressure at the liquid exhaust portion of the apparatus (in the space above the liquid receiver) to increase (or decrease) the liquid inflow rate, and finally the inflow ratio of $SO_3$/organic compound into the reaction vessel is kept constant.

If the flow resistance in the branched liquid flow passage has a suitable value, the flow rate ratio of $SO_3$/organic compound is equal in all the tubes, i.e., 0.1 – 0.8 Kg/cm² flow resistance, preferably 0.2 – 0.4 Kg/cm², even in the presence of change in the gas flow amount to each reaction tube. As a means to attain such a flow resistance, an orifice or slit is not preferred, but a fine tube having an inner diameter of 0.5 – 5mm, more preferably 1.0 – 3.0 mm is used. The range of ratios of length/inner diameter ratio of this fine tube is 10 – 1,000, more preferably 20 – 200 i.e., 20:1 to 200:1. It is possible to precisely regulate the flow resistance over the total liquid flow passage merely by using a fine tube of a specified length as mentioned above and adjusting the length.

It is to be specifically noted that this fine tube can occur at any point between the termination of the pipe 13 and the point where initial branch flow begins, i.e., where the common feed source is branched into a plurality of passages, and while earlier and/or later sections of the branched flow passage can have a greater diameter, at least one section must meet the requirements stated above to provide the full flow resistance regulation feature of this preferred feature of the invention. For example, the fine tube could be immediately after the origin of the branching passages, intermediate their origin and termination at the end of the tube 13, or could in fact be tube 13 or tube 14. Often, the fine tube will be an insert in a larger branched flow passage which reduces the inner diameter thereof for an appropriate length as defined above, whereafter the branched flow passage assumes its original, longer, diameter.

As mentioned above, by the reaction apparatus according to this invention, organic compounds apt to undergo side reactions can be reacted with sulfur trioxide on a large scale with good results. A further surprising feature of a highly preferred embodiment of this invention is the fact that the flow of a "secondary" inert gas (hereinafter called a "secondary gas" since this inert gas is introduced in a side stream, as opposed to the primary sulfur trioxide/inert gas stream introduced directly into the reaction gas nozzle) between the reaction gas nozzle 1 and the reaction pipe 6 can be used to increase the amount of organic compound treated per reaction tube.

Reference should be made to FIG. 2 illustrating a shell and tube assembly in accordance with the present invention where like numerals to those in FIG. 1 are used to identify like elements. In FIG. 2, 21 is the inlet tube for feeding secondary air, 22 is the outlet tube for cooling liquid, e.g., water, and 23 is the inlet for the cooling liquid, 24 is the shell, 25 is a supporting flange (pipe plate) for the bottom of the reaction tubes 6, 26 is the product outlet and 27 the inlet for the reaction gas, i.e., diluted sulfur trioxide.

The use of a secondary gas in a single- or double-tube reaction apparatus is described in U.S. Pat. No. 2,923,728 and British Pat. No. 1,248,348. The use of a secondary gas moderates the contact of sulfur trioxide and organic compound and is preferred from the point of good reaction results. However, there was not know prior to the present invention any apparatus capable of using a secondary gas in a multi-tube, parallel-flow thin-film reaction vessel suitable for industrial scale processes.

According to the reaction apparatus of this invention, the secondary gas can be introduced approximately uniformly into each reaction tube by providing an orifice having a substantially equal flow resistance in the outer tube 3 of each pipe and providing a tube for the secondary gas in the space between the pipe plate 4 and 5.

While highly preferred, it is to be understood that the use of a secondary gas (that is, an inert gas in addition to that used to dilute the sulfur trioxide prior to exiting the reaction gas nozzle 1 is optional, and that where such a secondary gas is not used the secondary gas entrance holes 20 in the apparatus of FIG. 1 may be omitted or plugged. In such a case, ancillary secondary gas apparatus as shown in FIG. 2 would, of course, be unnecessary.

As shown in FIG. 1 and 2, however, holes 20 having a substantially equal flow resistance are provided in the outer tube 3 of each pipe. Tube 21 is provided to feed the secondary gas into the space between the pipe plate 4 and 5. The number of the holes 20 is usually 2 – 10 in each outer tube. The secondary gas is an inert gas to the sulfur trioxide-inorganic compound reaction, e.g., air, nitrogen, and is used in an amount of less than 50 percent of total volume of inert gas, preferably 0 – 20 percent of the total inert gas. The pressure loss of holes 20 is preferably 100 – 5,000 mmH$_2$O. In FIG. 1, the secondary gas is shown introduced into the open area above the inner tube 2 and below the upper pipe plate 5.

A part of the heat which is generated from the reaction of an organic compound and sulfur trioxide is removed by flowing water up along the outside of the reaction pipe 6. The temperature of the water can be varied at several stages, i.e., water of varying temperatures can be flowed along different sections of the reaction pipe to obtain greater or lesser cooling effects by an appropriate compartmenting of the shell. The temperature of the water is generally below 100°C and above the freezing or crystallizing point of the organic compound.

The apparatus according to this invention can be used for the sulfation and sulfonation of various kinds of organic compounds, which can be reacted with sulfur trioxide, such as alkyl benzenes, α-olefines, primary aliphatic higher alcohols and the ethylene oxide adducts thereof, ethylene oxide adducts of secondary aliphatic higher alcohols, ethylene oxide adducts of alkyl phenols, propylene oxide adducts of primary aliphatic higher alcohols, propylene oxide adducts of secondary aliphatic higher alcohols, propylene oxide adducts of alkyl phenols, monocyclic and polycyclic aromatic hydrocarbons and alkyl-substituted derivatives thereof and the like.

As specific examples of such compounds, there can be mentioned olefins having about 8 – 20 carbon atoms such as octene, decene, dodecene, tetracene, hexadecene, octadecene, eicosene, tetradecadiene and octadecadiene; aliphatic alcohols having about 2 – 20 carbon atoms such as octyl alcohol, decyl alcohol, lauryl alcohol, tridecyl alcohol, tallow alcohol, octadecyl alcohol and eicosyl alcohol and the ethylene or propylene oxide adducts of these alcohols; the ethylene or propylene oxide adducts of straight chain secondary alcohols having about 8 – 20 carbon atoms; the ethylene or propylene oxide adducts of alkyl phenols having an alkyl radical of about 8 – 16 carbon atoms such as nonyl phenol; monocyclic or polycyclic aromatic hydrocarbons such as benzene, biphenyl, naphthalene, toluene, xylene, ethyl benzene, propyl benzene, butyl benzene, dibutyl benzene, hexyl benzene, octyl benzene, nonyl benzene, decyl benzene, dodecyl benzene, tridecyl benzene, tetradecyl benzene, hexadecyl benzene, octadecyl benzene, nonyl toluene, decyl toluene, dodecyl toluene, tetradecyl toluene, dodecyl xylene, dodecyl ethyl benzene, dodecyl isopropyl benzene, methyl biphenyl, ethyl biphenyl, butyl biphenyl, dipropyl biphenyl, tetradecyl biphenyl, octadecyl biphenyl, dodecyl methyl biphenyl, propyl tetradecyl biphenyl, methyl naphthalene, ethyl naphthalene, isopropyl naphthalene, butyl napthalene, diisopropyl naphthalene, hexyl naphthalene, octyl napthalene, decyl naphthalene, tetradecyl naphthalene, octadecyl naphthalene, dodecyl methyl naphthalene, ethyl tetradecyl naphthalene and the like and the alkyl-substituted derivatives thereof.

The exact reaction conditions described below are not overly important in the sense that the limits posed are overly critical, but will serve as an excellent guideline for the most efficient utilization of the apparatus of the present invention, i.e., when the mole ratio of sulfur trioxide to organic compound is about 0.9 to about 1.3, the mole ratio of sulfur trioxide to inert gas is about 0.003 to about 0.1 the temperature of operation is from the melting point of the organic compound to about 100°C. (the temperature of operation is the temperature of the cooling liquid), and the pressure of reaction is normal atmospheric or greater.

The inert gas "diluent" or "inert secondary gas" can be freely selected from those which are inert to the sulfur trioxide - organic liquid compound reaction. Typically, air or nitrogen are used. Having this generally described the invention, the following Example shows, inter alia, the use of a multi-tube assembly in accordance with the invention.

EXAMPLE 1

A 3 mol ethoxylate of a primary higher alcohol (Neodol-25-3, manufactured by Shell Oil Co., the adduct of a $C_{12-15}$ primary alcohol and 3 mols of ethylene oxide, mean molecular weight: 338) was sulfated with a diluted $SO_3$ gas by means of a reaction vessel, in which three reaction tubes having the gas and liquid introducing structure as shown in FIG. 1 were arranged in the shape of a shell and tube, and the reaction result obtained was compared with that obtained in a single reaction tube of the same structure.

For the reaction vessel, the reaction tube was 1½ inch stainless steel pipe (inner diameter: 42.8 mm) having a length of 8 m. Its top end was welded to the pipe plate. The reaction gas nozzle was finished with an accuracy of 28.6 ± 0.1 mm (inner diameter) and had a length of 550 mm, and its lower end was tapered at 5° (the taper chosen is not overly important and is, in any case, optional. The taper is shown by $\theta$ in FIG. 1). The clearance between the outer surface of the reaction gas nozzle and the inner surface of the reaction tube was 4.0 mm when the nozzle was set up, and the eccentricity of the nozzle to the reaction tube was set so that the clearance was 4.00 ± 0.05 mm. The distance from the liquid distributing holes to the bottom end of the reaction gas nozzle was 75 mm. No secondary gas was used in this Example.

The 3 mole ethoxylate of primary higher alcohol used as the starting material was heated to about 40°C, and then branched into three passages to pass through the flow resistance fine tubes, respectively, and fed to the liquid receiver having the liquid distributing holes.

The length of the fine tube (inner diameter: 2.0 mm, length: ca.70 mm) had been adjusted previously so that the flow amount from each of the three fine tubes was equal to within ± 1 percent, and the pressure loss at the standard flow amount was 0.2 Kg/cm². This assembly illustrates the use of a fine tube in the form of a narrowing insert in the branched flow passage. More specifically, in this Example the branched flow line had a total length from the splitting point of the feed line to tube 14 of 1000 mm and an inner diameter of 15 mm, and an insert narrowed ca.70 mm thereof to 2.0 mm inner diameter. The measurements of the tube 13 were I.D. 6 mm × L. 30 mm, and the measurements of the tube 14 were I.D. 6 mm × L. 100 mm. The total pressure loss over the tube 13 and the tube 14 is about 0.01 Kg/cm².

The liquid receiver could contain 150 mm of liquid till overflow occurred and the lower part thereof had 16 liquid distributing holes 1.6 mm in diameter in a horizontal plane (total of 48 holes for a three liquid receiver assembly). The holes were finished with an accuracy of ± 0.05 mm. The three reaction tubes were arranged in a shell and tube structure in a shell having a diameter of 350 mm, and a baffle was provided on the shell side permit the flow of cooling water at a constant temperature. When the process was carried out in only one reaction tube, the $SO_3$ gas nozzles of other two pipes were plugged and blind patches were set in the corresponding two branched tubes.

The sulfation was carried out for one reaction tube under the common conditions that hot water at 60°C flowed in the shell side and the $SO_3$ concentration was 1.3 percent of the $SO_3$ plus inert gas (air) on a volume basis. The $SO_3$ gas had an inlet temperature of 60°C and a flow amount of 3.6N m³/min., the flow amount of the 3 mole ethoxylate of the primary alcohol was 600 cc/min and the introduction mol ratio of $SO_3$: ethoxylate of primary alcohol was 1.15. Three reaction pipes were then used to introduce the liquid and gas in an amount of three times the amount in the one tube operation, and the reaction results were as follows:

| Number of reaction pipe used | Analysis of Neutralized Aqueous Solution of Reaction Product | | | Yield of Available Anion (mol %) from | |
|---|---|---|---|---|---|
| | Available Anions (wt.%) | Soluble Matter in Petroleum Ether (wt.%) | Shade | Available Anions | Soluble Matter in Petroleum Ether |
| 1 | 25.8 | 0.56 | 50 | 95.0 | 97.3 |
| 3 | 25.7 | 0.55 | 50 | 94.6 | 97.3 |

Note: The available anions value was determined by the Epton method (see Trans. Farady Soc., Vol. 44, p.228 (1948)). The shade value was 1,000 times the absorbance value, obtained by measuring an 8 wt. percent aqueous solution of the sodium salt of the reaction product with transmission light at 420 mμ in a color-difference meter using a cell 10 mm thick.

As is clear from the above table, the difference between the yields of available anions using three reaction tubes and that using only one reaction tubes is small. If a prior art reaction vessel having a known gas and liquid introducing structure is used, the yield of available anions using three reaction tubes in such a system drops about 1.5 percent as compared to using one reaction tube. From the above fact, the apparatus in accordance with the present invention is seen to be highly effective.

COMPARATIVE EXAMPLE 1

A 3 molar ethoxylate of a primary higher alcohol as in Example 1 was sulfated with a dilute $SO_3$ gas as in Example 1 by means of a reaction vessel having a gas and liquid introducing structure the same as in FIG. 1 except for the below-described points. In this comparative Example, however, only one reaction tube was used and the other two reaction tubes were plugged, i.e., two gas reaction nozzles were plugged and blind patches were set in the corresponding two branched tubes.

The reaction vessel used in this example different from that shown in FIG. 1 as follows: no liquid distributing holes 8 were provided in the inner tube 2; rather sixteen V-type notches were cut in the top end of the inner tube 2, and the liquid was fed as a thin film from the top end thereof.

For the reaction vessel, the reaction tube was a 1½ inch stainless steel pipe (inner diameter: 42.8 mm) having a length of 8 m. The reaction gas nozzle had an inner diameter of 22.2 mm, an outer diameter of 27.2 mm and a length of 550 mm. The clearance between the outer surface of the reaction gas nozzle and the inner surface of the reaction tube was 78 mm when the reaction gas nozzle was set up, and the eccentricity of the nozzle to the reaction tube was set so that the clearance was 78 mm ± 1.0 mm.

The 3 mole ethoxylate of primary higher alcohol (Neodol-25-3, manufactured by Shell Oil Co.,) used as the starting material was heated to about 40°C, passed through a flow meter, and fed to the liquid receiver having the structure heretofore described.

The sulfation was carried out in one reaction tube under the conditions that hot water at 60°C flowed in the shell side and the $SO_3$ concentration was 1.3 percent of the $SO_3$ plus inert gas (air) on a volume basis. The dilute $SO_3$ gas had on inlet temperature of 60°C and a flow amount of 3.6N m³/min., the flow amount of the 3 mole ethoxylate of the primary alcohol was 600 cc/min and the introduction molar ratio of $SO_3$: ethoxylate of the primary alcohol was 1.15.

Using the same analysis as in Example 1, the following results were obtained:

| Analysis of Neutralized Aqueous Solution of Reaction Product | | | Yield of Available Anion (mol%) from | |
|---|---|---|---|---|
| Available Anions (wt.%) | Soluble Matter in Petroleum Ether (wt.%) | Shade | Available Anions | Soluble Matter in Petroleum Ether |
| 25.3 | 0.91 | 55 | 93.2 | 95.3 |

As is clear from the above results, in the reaction vessel consisting of one reaction tube having the gas and liquid introducing structure is accordance with the present invention, higher yields of available anions than obtained by using the reaction vessel of the Comparative Example having the gas and liquid introducing structure described therein are obtained.

While the invention has been described in detail and with reference to specific embodiments thereof, it will be apparent to one skilled in the art that various changes and modifications can be made therein without departing from the spirit and scope thereof.

What is claimed is:

1. A multi-tube thin-film type reaction apparatus for the reaction of a liquid organic compound and gaseous sulfur trioxide, said apparatus comprising a plurality of tube assemblies comprising a reaction tube provided with a gas- and liquid-feeding structure at the upper portion of the reaction tube, characterized in that: the reaction tubes are provided substantially vertically and have an inner diameter of 16–90 mm, an inner tube of a diameter substantially equal to that of the reaction tube and having liquid-distributing holes of 1–3 mm in diameter is provided at the top end of each reaction tube, said inner tube being surrounded by an outer tube to form a liquid receiver between both tubes, liquid organic compound feed means communicating with said liquid receiver, a reaction gas nozzle inserted in the interior of said inner tube and communicating with and at least partially extending into said reaction tube to permit the substantially uninterrupted flow of reaction gas from the reaction gas nozzle to said reaction tube, the lateral clearance between said reaction tube and said reaction gas nozzle being greater than 2 mm and the end of said reaction gas nozzle being 5 – 300 mm below said liquid-distributing holes, a pressure-leveling opening being provided between the upper portion of said liquid receiver and the upper portion of said inner tube, and liquid organic compound feed means is provided where at least a portion of each liquid organic feed means having an inner diameter of 0.5 – 5 mm and a length/inner diameter ratio of 10 – 1,000 to render the flow resistance from the source of liquid organic compound to the liquid receiver within the range 0.1 – 0.8 Kg/cm².

2. An apparatus as claimed in claim 1 further having a plurality of orifices of substantially equal flow resistance at the upper part of each outer tube of a tube assembly for the introduction of secondary gas, said orifices being coupled to a secondary gas source.

3. An apparatus as claimed in claim 1 where the plurality of tube assemblies are enclosed in a shell provided with means to circulate a cooling medium at least about the exterior of said reaction tubes.

4. An apparatus as claimed in claim 3 where the top of said reaction tubes is attached to a pipe plate which supports the bottom of the gas- and liquid-feeding structure and separates the gas-and liquid-feeding structure from the cooling medium.

5. An apparatus as claimed in claim 1 where said liquid organic compound feed means comprises a common source of liquid organic compound which is branched into a plurality of individual flow passages, each flow passage feeding liquid organic compound to each liquid receiver, whereby upon the passage of reactant gas through said reaction gas nozzle a substantially constant molar ratio of liquid organic compound/reactant gas is maintained in each of said reaction tubes.

6. An apparatus as claimed in claim 5 where the lateral clearance between the outside wall of the bottom end of said reaction gas nozzle and the inner wall of said reaction tube is 3 – 5 mm.

7. An apparatus as claimed in claim 5 where the center line of the reaction gas nozzle and the center line of the reaction tube in a tube assembly are in-line to within 0.5 mm.

8. An apppatus as claimed in claim 7 where the reaction nozzle has a length of greater than 150 mm.

* * * * *